3,007,922
Patented Nov. 7, 1961

3,007,922
PROCESS FOR THE PREPARATION OF IMINO-
PREGNENES NOVEL STEROID INTERMEDI-
ATES PREPARED THEREBY AND NOVEL 18,20-
OXYGENATED STEROID DERIVATIVES
Vlasios Georgian, Evanston, Ill., and James F. Kerwin,
Broomall, and Manfred E. Wolff, Elkins Park, Pa., as-
signors to Smith Kline & French Laboratories, Phila-
delphia, Pa., a corporation of Pennsylvania
No Drawing. Filed Nov. 9, 1959, Ser. No. 851,507
21 Claims. (Cl. 260—239.5)

This invention relates to a process for the preparation of $\Delta^{20,N}$-18,20-iminopregnenes and to novel steroid derivatives prepared thereby. Further, this invention relates to novel 18,20-oxygenated steroid derivatives. The steroid derivatives prepared by the process of this invention are useful as intermediates in the preparation of the 18,20-oxygenated steroids which have valuable therapeutic activity particularly as diuretics.

More specifically, the 18,20-oxygenated steroids of this invention respectively are useful as diuretic, anti-inflammatory and anabolic agents, and as blockers of aldosterone (anti-aldosterones). The C–18 oxygen functionalized steroids have recently gained importance as blockers of aldosterone, the principal hormone responsible for sodium retention. Several clinical disorders such as cirrhosis, nephrosis and congestive heart failure lead to sodium retention and edema, and are associated with increased secretion of aldosterone. C–18 oxygenated steroids in blocking the effects of aldosterone increase sodium excretion leading to a diuretic action and thereby are useful therapeutic agents. The C–18 oxygenated steroids of this invention in addition to such diuretic activity are useful in the synthesis of the more highly substituted aldosterone-like compounds. In addition, the close relationship of the C–18 oxygenated steroids prepared from the intermediates of this invention to the known adrenocortical and sex hormones ascribe to the former compounds some of the parent's respective pharmacological effects such as anti-inflammatory activity when the basic structures resemble the corticoid agents and anabolic properties when the basic structures resemble the testosterones.

The process of this invention for the preparation of $\Delta^{20,N}$-18,20-iminopregnenes is schematically represented as follows:

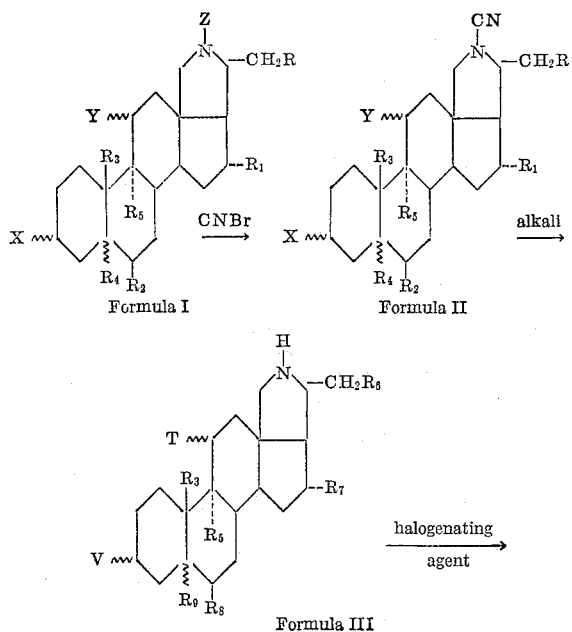

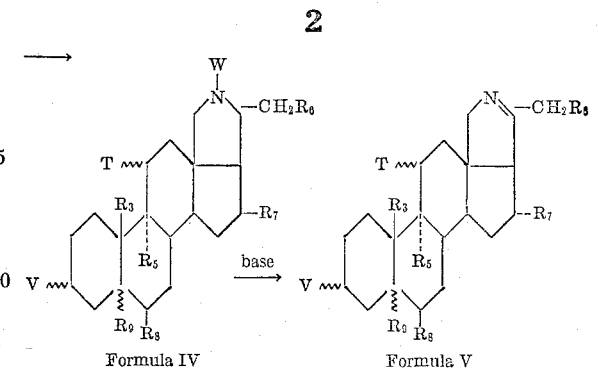

when:
$\xi$ is either $\alpha$ or $\beta$;
X and Y represent hydrogen, hydroxy, acyloxy or keto, preferably hydroxy or keto;
R and $R_4$ represent hydrogen, hydroxy or acyloxy;
$R_1$ represents hydrogen, hydroxy, acyloxy or methyl, preferably hydrogen;
$R_2$ represents hydrogen, hydroxy, acyloxy, methyl or fluoro, preferably hydrogen;
$R_3$ represents hydrogen or methyl, preferably methyl;
$R_5$ represents hydrogen or fluoro, preferably hydrogen;
Z represents lower alkyl, preferably methyl;
V and T represent hydrogen, hydroxy or keto, preferably hydroxy or keto;
$R_6$ and $R_9$ represent hydrogen or hydroxy;
$R_7$ represents hydrogen, hydroxy or methyl, preferably hydrogen;
$R_8$ represents hydrogen, hydroxy, methyl or fluoro, preferably hydrogen; and
W represents halogen of atomic weight less than 80, such as chlorine or bromine, preferably chlorine.

As will be evident from the description below the process of this invention affords an advantageous route for the preparation of the $\Delta^{20,N}$-18,20-iminopregnenes of Formula V from the conanine derivatives of Formula I. Further, the utility of the intermediates of Formulae II, III and IV in the process will be apparent.

It is desired to point out that the general structural formulae depicted here and in the claims are intended to cover steroids with an A/B cis or A/B trans juncture. Further, where used herein the term "acyl" is used to denote an organic hydrocarbon carboxylic acid radical having a maximum of 6 carbon atoms such as alkanoyl, for example acetyl, trifluoroacetyl or hemisuccinyl; and the term "lower alkyl" is used to denote an aliphatic hydrocarbon group having a maximum of 6 carbon atoms. The term "conanine", where used herein generically, includes the 20α or 20β and the 5α or 5β configurations, as well as N-substituted derivatives. The term "iminopregnene" where used herein generically is intended to include both the normal and allopregnene derivatives.

In accordance with the novel process of this invention as shown above, the conanine derivative of Formula I is treated with cyanogen bromide to give the N-cyanonorconanine derivatives of Formula II above. Advantageously, the conanine is dissolved in an unreactive organic solvent such as ether or chloroform and treated with a solution of cyanogen bromide dissolved in a similar unreactive organic solvent. The reaction mixture is allowed to stand at about ambient or room temperature (about 25° C.) or maintained at an elevated temperature up to the reflux temperature of the solvent employed, until the reaction is completed, normally for a long period of time, for example from one to five days. Preferably the reaction is carried out under anhydrous conditions. The N-cyanonorconanine is isolated by evaporation of the solvent and acid extraction of the residue, for example with glacial acetic acid. Advantageously, the acyloxy rather than the free hydroxy substituted conanines are employed in this step of the process.

The N-cyanonorconanine is hydrolyzed to give the N-norconanine derivatives of Formula III above. Advantageously the N-cyanonorconanine is dissolved in a polar organic solvent, preferably a lower alkanol such as methanol or ethanol and treated with an excess of an alkali metal hydroxide, such as sodium or potassium hydroxide, preferably potassium hydroxide. The reaction mixture is boiled until the reaction is completed, normally for from 24 to 72 hours. The N-norconanine is isolated by pouring the reaction mixture into a large volume of water and the solid removed. Alternatively, after treatment with water the N-norconanine is extracted into an unreactive organic solvent such as chloroform and the organic extract is used directly in the following halogenation step of the process. The hydrolysis step is alternatively carried out by heating as above with an acid, such as for example with sulfuric acid or a mineral acid such as hydrochloric acid.

The N-norconanine is treated with a halogenating agent to give the N-halonorconanine derivatives of Formula IV above. Advantageously the N-norconanine is dissolved in an unreactive organic solvent for example chloroform and is treated with a halogenating agent such as for example N-chlorosuccinimide, N-bromosuccinimide, N-bromoacetamide, hypochlorous acid or sodium hypochlorite, at ambient or room temperature (about 25° C.) for from 15 minutes to three hours, preferably 30 minutes. Preferably the halogenating agent is removed and the treatment repeated. Evaporation of the organic solvent yields the N-halonorconanine.

The N-halonorconanine is then dehydrohalogenated to give the $\Delta^{20,N}$-18,20-iminopregnenes of Formula V above. Advantageously the N-halonorconanine is dissolved in a polar organic solvent, preferably a lower alkanol such as methanol or ethanol and treated with base such as an alkali metal hydroxide, for example sodium or potassium hydroxide, or an alkali metal lower alkoxide, for example sodium or potassium methoxide or ethoxide. The reaction mixture is heated at reflux for from 30 minutes to three hours, preferably one hour. The product is isolated by pouring the reaction mixture into water, extracting with for example chloroform and evaporating the solvent.

It will be noted that in the above described process, where basic conditions are employed, all acyloxy groups which may be present are hydrolyzed to the corresponding hydroxy groups. Thus, the treatment of the N-cyanonorconanines with alkali results in hydrolysis of any acyloxy groups. The corresponding hydroxy substituted N-norconanines are then carried through the ensuing reaction sequence described above. If it is desired to obtain an acyloxy substituted N-norconanine, the corresponding hydroxy substituted N-norconanine is acylated in the presence of hydrobromic acid or p-toluenesulfonic acid with for example acetic anhydride. The acyloxy substituted N-norconanine is then halogenated as described above to give the corresponding acyloxy substituted N-halonorconanine.

It will be obvious to one skilled in the art that simple variations of the methods for the preparation of any of the steroid derivatives disclosed herein are possible. For example, derivatives having a 3- or 11-hydroxy moiety may be oxidized to the corresponding keto derivative by standard procedures such as for example chromic oxide and acetic acid, or pyridine. Similarly a 3- or 11-keto moiety may be reduced to hydroxy by catalytic reduction or with a bimetallic hydride such as for example lithium aluminum hydride or sodium borohydride.

The starting materials for the process of this invention, namely the conanine derivatives of Formula I above, are prepared from the corresponding 20-alkylamino steroids in accordance with the process disclosed in our copending application Serial No. 843,334, filed September 30, 1959.

The 20-alkylamino steroids are in turn obtained from the corresponding 20-keto steroids by a reductive amination process as disclosed in our copending application Serial No. 821,348, filed June 19, 1959, now Pat. No. 2,983,736. According to the process of Serial No. 821,348, the 20-keto steroid is hydrogenated in the presence of a primary lower alkyl amine dissolved in an unreactive organic solvent such as dioxane, ethanol or methanol, and a hydrogenation catalyst such as platinum oxide at about room temperature until one mole of hydrogen is absorbed. Acid treatment of the reaction residue isolates the 20-alkylamine.

According to the process of Serial No. 843,334 the 20-(N-alkyl-N-haloamino) steroid (obtained from the 20-alkylamine by treatment with a halogenating agent such as N-chlorosuccinimide or sodium hypochlorite) is irradiated with ultraviolet light in the presence of trifluoroacetic acid at from —20° C. to about 40° C. and the intermediate 18-halo steroid is treated with an alkali metal hydroxide such as potassium hydroxide in a lower alkanol solvent at reflux temperature for from 30 minutes to 24 hours. Extraction of the reaction solution yields the conanine upon evaporation.

The novel N-cyanonorconanines, N-norconanines and N-halonorconanines which are useful as intermediates in the preparation of $\Delta^{20,N}$-18,20-iminopregnenes as described above are represented by the following formulae:

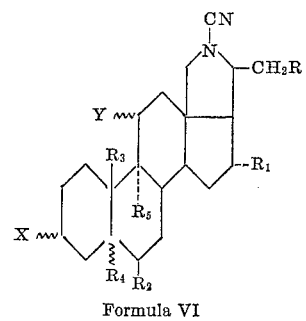

Formula VI

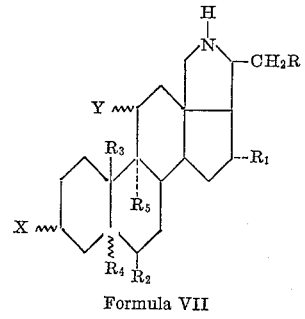

Formula VII

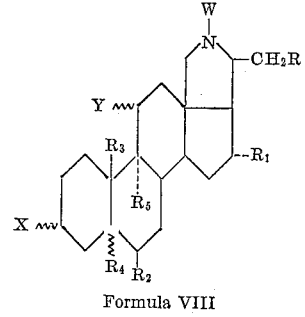

Formula VIII when:

$\xi$ is either $\alpha$ or $\beta$;

X and Y represent hydrogen, hydroxy, acyloxy or keto, preferably hydroxy or keto;

R and $R_4$ represent hydrogen, hydroxy or acyloxy;

$R_1$ represents hydrogen, hydroxy, acyloxy or methyl, preferably hydrogen;

$R_2$ represents hydrogen, hydroxy, acyloxy, methyl or fluoro, preferably hydrogen;

$R_3$ represents hydrogen or methyl, preferably methyl;

$R_5$ represents hydrogen or fluoro, preferably hydrogen; and

W represents halogen of atomic weight less than 80, such as chlorine or bromine, preferably chlorine.

The novel substituted $\Delta^{20,N}$-18,20-iminopregnenes prepared as described above are represented by the following structural formula:

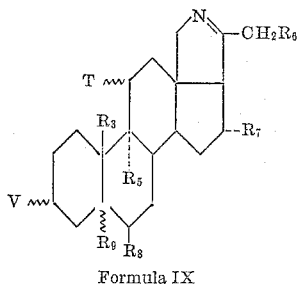

Formula IX when:

$\xi$ is either $\alpha$ or $\beta$;

V and T represent hydrogen, hydroxy or keto;

$R_6$ and $R_9$ represent hydrogen or hydroxy;

$R_7$ represents hydrogen, hydroxy or methyl;

$R_8$ represents hydrogen, hydroxy, methyl or fluoro;

$R_3$ represents hydrogen or methyl; and $R_5$ represents hydrogen or fluoro.

Advantageous novel $\Delta^{20,N}$-18,20-iminopregnenes are the 11-oxygenated derivatives, especially those represented by Formula IX above when:

V and T represent hydroxy or keto;

$R_6$ represents hydrogen or hydroxy;

$R_7$, $R_8$, $R_9$ and $R_5$ represent hydrogen; and $R_3$ represents hydrogen or methyl, preferably methyl.

The $\Delta^{20,N}$-18,20-iminopregnenes of Formula IX described above are useful as intermediates in the preparation of the corresponding therapeutically valuable 18,20-oxygenated steroids shown as follows:

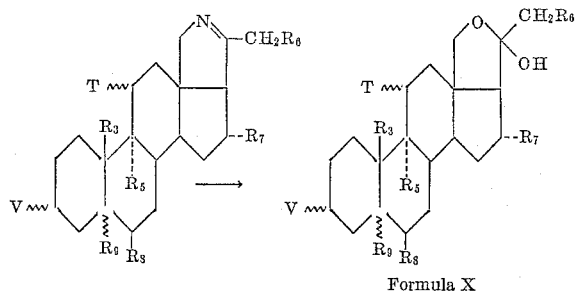

Formula X when $\xi$, V, T, $R_3$, $R_5$, $R_6$, $R_7$, $R_8$ and $R_9$ are defined for Formula IX above.

It will be noted that the 18-20-oxygenated steroid derivatives of Formula X above may exist as the 18-hydroxy tautomeric form:

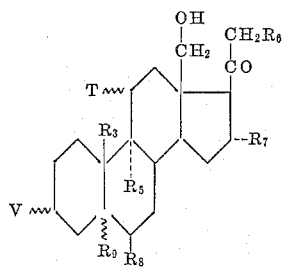

and when T represents keto may exist as the 11,18-epoxide tautomeric form:

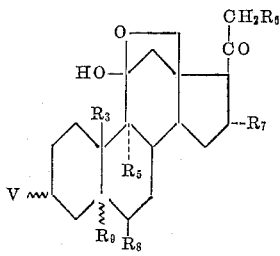

The 18,20-oxygenated steroids of Formula X are prepared by treating the intermediate $\Delta^{20,N}$-18,20-iminopregnene with nitrous acid. Advantageously a stirred solution of the $\Delta^{20,N}$-18,20-iminopregnene in aqueous acetic acid is treated dropwise with an aqueous solution of sodium nitrite at 0° C. The reaction mixture is allowed to stand at ambient or room temperature, or from 25 to 30° C., for from 12 to 36 hours and the solid product is removed by filtration. Acylation of the 18,20-oxygenated steroids of Formula X with an acyl anhydride for example acetic anhydride gives the corresponding acyloxy derivatives.

The novel 18,20-oxygenated steroids prepared from the intermediate $\Delta^{20,N}$-18,20-iminopregnenes as described above which are useful as diuretics, anti-inflammatory agents, anabolic agents, and anti-aldosterones are represented by the following structural formulae:

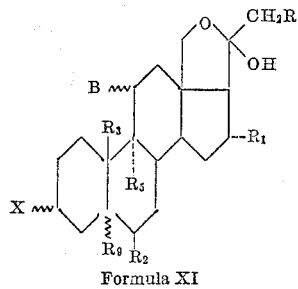

Formula XI

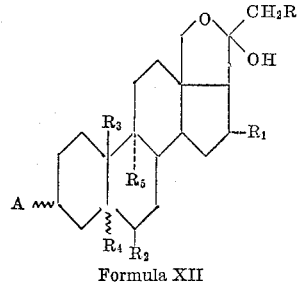

Formula XII

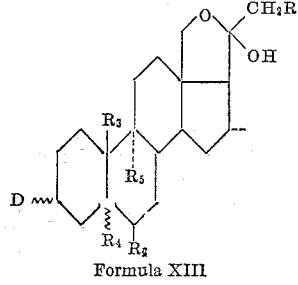

Formula XIII

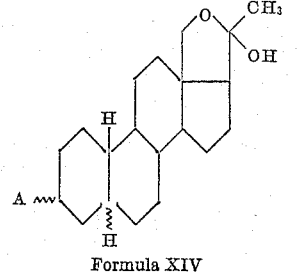

Formula XIV when:

ξ is either α or β;
X represents hydrogen, hydroxy, acyloxy or keto, preferably keto;
B represents hydroxy, acyloxy or keto;
R and $R_4$ represent hydrogen, hydroxy or acyloxy;
$R_1$ represents hydrogen, hydroxy, acyloxy or methyl, preferably hydrogen;
$R_2$ represents hydrogen, hydroxy, acyloxy, methyl or fluoro, preferably hydrogen, hydroxy or fluoro;
$R_3$ represents hydrogen or methyl;
$R_5$ represents hydrogen or fluoro;
A represents hydroxy or acyloxy; and
D represents hydrogen or keto, preferably keto.

In the above Formula XII at least one of the substituents R, $R_1$, $R_2$, $R_4$ and $R_5$ is other than hydrogen.

Advantageous novel 18,20-oxygenated steroids are the 11-oxygenated derivatives represented by Formula XI above, particularly when:

X and B represent hydroxy, acyloxy or keto, preferably keto;
R represents hydrogen, hydroxy or acyloxy;
$R_1$, $R_2$, $R_4$ and $R_5$ represent hydrogen; and
$R_3$ represents hydrogen or methyl, preferably methyl.

The therapeutically valuable 18,20-oxygenated steroid derivatives described in this invention are further useful as intermediates in the preparation of the corresponding 3-keto-$\Delta^4$-18,20-oxygenated steroids of Formula XV below which are likewise useful as diuretic, anti-inflammatory, anabolic and anti-aldosterone agents. Particularly useful as intermediates are the 3-oxygenated saturated derivatives. The saturated steroids are converted to the 3-keto-$\Delta^4$-derivatives schematically shown as follows:

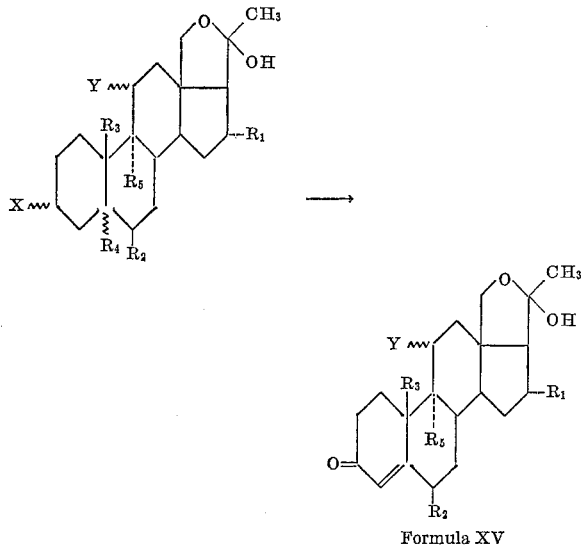

Formula XV when:

ξ is either α or β;
X represents hydroxy, acyloxy or keto;
Y represents hydrogen or keto;
$R_1$ and $R_3$ represent hydrogen or methyl;
$R_2$ represents hydrogen, methyl or fluoro;
$R_4$ represents hydrogen, hydroxy or acyloxy; and
$R_5$ represents hydrogen or fluoro.

The 18,20-oxygenated steroids are converted to the 3-keto-$\Delta^4$-derivatives as shown above by standard methods known to the art. Thus, for example, the 3-keto group is obtained by oxidation of the 3-hydroxy group with an oxidizing agent such as chromic oxide in acetic acid (the 3-acyloxy group is hydrolyzed to hydroxy by refluxing with an alkali metal hydroxide such as potassium hydroxide). The double bond is introduced at the 4-position by standard bromination and debromination of the A ring. When $R_4$ is hydroxy in the above formula, the double bond is introduced by dehydration at the 4,5-position (preceded by hydrolysis when $R_4$ is acyloxy). The dehydration may be effected by several methods such as for example with thionyl chloride or phosphorus oxychloride and pyridine, hydrogen chloride in chloroform or potassium hydroxide.

The moieties described hereabove have been limited for purposes of simplification. Thus, for instance the $R_2$, $R_5$ and $R_8$ moieties are described as fluoro but other halogens such as chloro or bromo could be substituted therefor. Also, the moieties in the 6-position may be α or β configurations. The 6β-moieties are isomerized to the 6α-position by exposure to acid or base. All isomers not specifically mentioned but covered in the general structural formulae and names are intended to be included in this invention.

The following examples will serve to illustrate the novel process of this invention, the utility of certain conanine derivatives therein, the compounds prepared thereby and the utility of $\Delta^{20,N}$-18,20-iminopregnenes as intermediates in the preparation of the therapeutically valuable 18,20-oxygenated steroids of Formula X. As illustrative examples the following are not intended to limit the scope of this invention since all of the steroid derivatives represented hereabove are prepared by methods analogous to those disclosed hereinafter. Obvious alternatives to the methods disclosed are likewise within the purview of this invention.

*Example 1*

The conanine derivatives of Formula I used as starting materials in this invention are obtained from corresponding 20-alkylamino steroids by converting the latter compounds to the 20-(N-alkyl-N-haloamino) steroid derivatives, followed by irradiation with ultraviolet light in the presence of trifluoroacetic acid and then treated with alkali to give the ring closed conanine as disclosed in copending application Serial No. 843,334, filed September 30, 1959. The 20-alkylamino steriods used to prepare the above conanines are obtained from corresponding 20-keto steroids by a reductive amination process as disclosed in copending application Serial No. 821,348, filed June 19, 1959. These processes are generally outlined in the above description. The following example will serve to give a specific preparation of a conanine derivative according to the processes of the two above identified copending applications.

A solution of 100 g. of 3β-hydroxy-11,20-allopregnandione in 1 l. of absolute alcohol containing an excess of methylamine is allowed to stand at room temperature for one hour. Platinum oxide (3.0 g.) is added and the mixture is shaken with hydrogen at atmospheric pressure until one mole of hydrogen is absorbed. The catalyst is removed by filtration and the filtrate is taken to dryness in vacuo. The solid syrup obtained is suspended in acetone and filtered. The solid is dissolved in glacial acetic acid, diluted with a large volume of water and extracted with ether. The aqueous layer is adjusted to pH 11 with 40% sodium hydroxide solution. The solid which precipitated is filtered and dried in vacuo over phosphorus pentoxide. The pure product 3β-hydroxy-20-methylamino-11-allopregnanone is obtained by recrystallization from toluene, M.P. 187–189° C. $[\alpha]_D^{25}+55.9°$ (c.=1.00 in chloroform).

A solution of 12.1 g. of 3β-hydroxy-20-methyl-amino-11-allopregnanone in 600 ml. of chloroform is stirred with 600 ml. of 5% sodium hypochlorite solution for one hour, when the hypochlorite is removed and the treatment is repeated. The chloroform layer is separated, washed with water, dried and evaporated to yield 13.3 g. of colorless solid, 3β-hydroxy-20-(N-methyl-N-chloroamino)-11-allopregnanone.

The N-chloroamine is dissolved in 130 ml. of redistilled trifluoroacetic acid and subjected to ultra-violet irradiation under nitrogen atmosphere for 40 minutes. The trifluoroacetic acid is evaporated in vacuo and the residual 3β-hydroxy-18-chloro-20-methylamino-11-allopregnanone is dissolved in 150 ml. of methanol, made strongly basic with 25% methanolic potassium hydroxide solution and refluxed for one hour. The solution is concentrated in vacuo, poured into 1000 ml. of water and extracted with chloroform. The residue obtained from evaporation of the washed, dried chloroform solution is boiled for two hours with 25 ml. of acetic anhydride, poured into 500 ml. of water and filtered. The clear filtrate is made alkaline in the cold to pH 11 and extracted with chloroform. The chloroform layer is washed with water, dried and evaporated to give 3β-acetoxy-11-ketoconanine. Recrystallization from ethanol affords colorless needles, M.P. 186–189° C., $[\alpha]_D^{25}+83.0°$ (c.=1.00).

Example 2

To a solution of 6.3 g. of 3β-acetoxy-11-ketoconanine in 600 ml. of ether is added under exclusion of moisture a dry solution of 6.3 g. of cyanogen bromide in 100 ml. of ether and the reaction is maintained at 27° C. for 90 hours. The ether is boiled off and the residue is dissolved in 20 ml. of glacial acetic acid, diluted with 200 ml. of water and extracted into chloroform. The chloroform extract is washed with water, 10% sodium hydroxide solution and water, dried and evaporated. The residue is recrystallized from ethyl acetate to give 3β-acetoxy-11-keto-N-cyanonorconanine as colorless prisms, M.P. 218–220° C., $[\alpha]_D^{25}+104°$ (c.=1.00 in chloroform).

A solution of 3.5g. of 3β-acetoxy-11-keto-N-cyanonorconanine in 75 ml. of 95% alcohol containing 11.0 g. of potassium hydroxide is boiled for 40 hours and poured into 800 ml. of water. The N-norconanine is extracted into chloroform and the chloroform solution stirred with two 100 ml. portions of 5% sodium hypochlorite solution, each time for thirty minutes. The residue from evaporation of the washed dried chloroform layer is treated with methanol and then recrystallized from aqueous methanol to give 3β-hydroxy-11-keto-N-chloronorconanine as colorless needles, M.P. 270° C. dec., $[\alpha]_D^{25}+98.9°$ (c.=1.00 in chloroform).

A solution of 5.0 g. of potassium hydroxide and 2.0 g. of 3β-hydroxy-11-keto-N-chloronorconanine in 25 ml. of methanol is boiled under reflux for one hour, poured into 500 ml. of water and extracted with chloroform. The washed, dried chloroform solution is evaporated to give 3β-hydroxy-11-keto-$\Delta^{20,N}$-18,20-iminoallopregnene which is recrystallized from ethyl acetate to give yellow prisms, M.P. 238–241° C., $[\alpha]_D^{25}+61.7°$ (c.=1.00 in chloroform).

A stirred solution of 1.0 g. of 3β-hydroxy-11-keto-$\Delta^{20,N}$-18,20-iminoallopregnene in 2 ml. of glacial acetic acid and 9 ml. of water is treated dropwise at 0° C. with a solution of 0.5 g. of sodium nitrite in 2 ml. of water. Nitrogen evolves and the mixture is allowed to stand for 18 hours at 27° C. The solid precipitate is filtered and recrystallized from ethyl acetate and then aqueous acetone to yield colorless crystals of 3β,18-dihydroxy-11,20-allopregnanedione, M.P. 110–115° C., 200° C. The dihydroxydione is in equilibrium with its corresponding tautomeric forms.

Example 3

To a solution of 6.3 g. of 3α-acetoxy-11-keto-5β-conanine in 600 ml. of ether is added in a moisture free atmosphere a dry solution of 6.3 g. of cyanogen bromide in 100 ml. of ether. The mixture is maintained at 27° C. for 90 hours and then the ether is boiled off. The residue is dissolved in 20 ml. of glacial acetic acid, diluted with 200 ml. of water and extracted into chloroform. The extract is washed successively with water, 10% sodium hydroxide and water, and then dried and evaporated. The residue is recrystallized to give 3α-acetoxy-11-keto-5β-N-cyanonorconanine.

A solution of 7.0 g. of the above conanine derivative in 150 ml. of 95% alcohol containing 22.0 g. of potassium hydroxide is boiled for 40 hours and then poured into 1.5 l. of water. The mixture is extracted with chloroform and the extract containing the N-norconanine is stirred with two 200 ml. portions of 5% sodium hypochlorite solution, each time for 30 minutes. The chloroform layer is washed, dried and evaporated to give the residual 3α-hydroxy-11-keto-5β-N-chloronorconanine.

A solution of 2.5 g. of potassium hydroxide and 1.0 g. of 3α-hydroxy-11-keto-5β-N-chloronorconanine in 15 ml. of methanol is refluxed for one hour. The reaction mixture is poured into 250 ml. of water and extracted with chloroform. The washed, dried chloroform extract is evaporated to give 3α-hydroxy-11-keto-5β-$\Delta^{20,N}$-18,20-iminopregnene.

A solution of 2.0 g. of 3α-hydroxy-11-keto-5β-$\Delta^{20,N}$-18,20-iminopregnene in 4 ml. of glacial acetic acid and 18 ml. of water is stirred and treated dropwise at 0° C. with a solution of 1.0 g. of sodium nitrite in 4 ml. of water. The mixture is allowed to stand for 18 hours at 27° C. The solid precipitate is filtered and recrystallized to yield 3α,18-dihydroxypregnan-11,20-dione which is in equilibrium with the corresponding tautomeric forms.

Example 4

Forty grams of 3β-hydroxyconanine and 72 ml. of acetic anhydride are refluxed for two hours. The warm solution is poured into 700 ml. of water and after the anhydride is hydrolyzed, supercel is added and the mixture filtered. The filtrate is made basic and extracted with chloroform. The chloroform extract is washed with sodium carbonate solution and water, dried and evaporated. The residue is recrystallized from acetone to yield 3β-acetoxyconanine, M.P. 164.5–168° C.

A solution of 25.0 g. of 3β-acetoxyconanine and 26.0 g. of cyanogen bromide in 1500 ml. of ether is allowed to stand at room temperature for four days. The mixture is filtered to remove 4.0 g. of 3-acetoxyconanine methobromide. The ether filtrate is extracted with dilute acetic acid to remove a small amount of unreacted starting material. After washing the ether solution with sodium carbonate solution and drying, the solvent is removed and the residue recrystallized from ethyl acetate to yield 3β-acetoxy-N-cyanonorconanine, M.P. 178–181.5° C.

Ten grams of 3β-acetoxy-N-cyanonorconanine and 105 g. of potassium hydroxide in 700 ml. of alcohol are refluxed for 48 hours. The solution is diluted with several volumes of water and the solid collected. Recrystallization of the solid from acetone gives 3β-hydroxynorconanine, M.P. 169–172° C.

A chloroform solution of the above prepared 3β-hydroxynorconanine is stirred with 100 ml. of 5% sodium hypochlorite for one-half hour, when the hypochlorite is removed and the treatment is repeated. The chloroform layer is separated, washed with water, dried and evaporated to yield a residual syrup. The residual syrup is crystallized from 15 ml. of acetonitrile to give 3β-hydroxy-N-chloronorconanine as colorless needles which after recrystallization melts at 111–114° C., resolidifies M.P. 268° C. dec., $[\alpha]_D^{25}+96.8°$ (c.=1.00 chloroform).

3β-hydroxy-N-chloronorconanine, prepared from 7.2 g. of 3β-hydroxynorconanine, and 10.0 g. of sodium methoxide in 500 ml. of methanol are refluxed for about one hour. The solution is concentrated in vacuo, diluted with water and extracted into chloroform. The chloroform solution is washed, dried and evaporated and the residue is recrystallized from acetone to give the product, 3β-hydroxy-$\Delta^{20,N}$-18,20-iminoallopregnene M.P. 180–182.5° C.

A stirred solution of 2.0 g. of 3β-hydroxy-$\Delta^{20,N}$-18,20-iminoallopregnene in 4 ml. of glacial acetic acid and 18 ml. of water is treated dropwise at 0° C. with a solution of 1.0 g. of sodium nitrite in 4 ml. of water. Nitrogen evolves and the mixture is allowed to stand for 18 hours at 27° C. The precipitate is filtered and recrystallized to give 3β,18-dihydroxy-20-allopregnanone which is in equilibrium with the corresponding 18,20-hemiketal.

Treating the above dihydroxy allopregnanone (0.5 g.) with 2 ml. of acetic anhydride in 10 ml. of pyridine at room temperature for 12 hours yields 3β-acetoxy-18-hydroxy-20-allopregnanone.

*Example 5*

To a solution of 6.1 g. of 3α-acetoxy-5β-conanine in 600 ml. of ether is added under exclusion of moisture a dry solution of 6.1 g. of cyanogen bromide in 100 ml. of ether. The reaction is maintained at 27° C. for 90 hours. The ether is removed and the residue is dissolved in 20 ml. of glacial acetic acid, diluted with 200 ml. of water and extracted into chloroform. The chloroform extract is washed with water, 10% sodium hydroxide solution and water, dried, and evaporated to give 3β-acetoxy-5β-N-cyanonorconanine.

The cyanonorconanine (0.2 g.) is dissolved in 150 ml. of alcohol containing 19.5 g. of potassium hydroxide and refluxed for 40 hours. The cooled solution is poured into one liter of water and extracted with chloroform. The chloroform layer is separated and washed with water until neutral.

The washed chloroform solution containing the 3α-hydroxy-5β-N-norconanine is stirred with 200 ml. of 5% sodium hypochlorite for one-half hour, when the hypochlorite is removed and the treatment is repeated. The chloroform layer is separated, washed with water, dried and evaporated to yield 7.3 g. of yellow oil. The oil is dissolved in 75 ml. of methanol and treated with 25% methanolic potassium hydroxide until strongly alkaline. After refluxing for one hour, the solution is concentrated and poured into 400 ml. of water, extracted with chloroform, washed, and dried over sodium sulfate. Evaporation of the chloroform in vacuo produces an oil which crystallizes upon trituration with acetone to yield 3α-hydroxy-$\Delta^{20,N}$-18,20-iminopregnene, M.P. 218–224° C.

A solution of 1.0 g. of the above iminopregnene in 2 ml. of glacial acetic acid and 9 ml. of water is stirred and a solution of 0.5 g. of sodium nitrite in 2 ml. of water is added dropwise at 0° C. The mixture is allowed to stand at room temperature for 18 hours and the precipitate is filtered to give the product, 3α,18-dihydroxypregnan-20-one. The product exists in equilibrium with the corresponding 3α,20-dihydroxypregnan-18,20-hemiketal.

*Example 6*

A solution of 2.0 g. of 3-ketoconanine and 2.0 g. of cyanogen bromide in 100 ml. of ether under anhydrous conditions is allowed to stand at room temperature for four days. The reaction mixture is filtered and the filtrate is washed with 5% acetic acid and water to neutral. The ether solution is then evaporated to dryness to give an oil which slowly crystallized. The solid product, 3-keto-N-cyanonorconanine, is recrystallized from aqueous acetone to melt at 146.5–148.5° C.

A solution of 3.6 g. of the N-cyanonorconanine and 11.0 g. of potassium hydroxide in 100 ml. of 95% alcohol is refluxed for 48 hours and then poured into water. The resulting 3-keto-N-norconanine is extracted into chloroform and the chloroform solution is stirred with two 100 ml. portions of 5% sodium hypochlorite solution, each time for 30 minutes. The chloroform layer is washed, dried and evaporated to give 3-keto-N-chloronorconanine.

A solution of 3.0 g. of the N-chloronorconanine and 5.5 g. of potassium hydroxide in 50 ml. of methanol is refluxed for one hour. The reaction mixture is poured into water, extracted into chloroform and the washed, dried chloroform extract is evaporated to yield 3-keto-$\Delta^{20,N}$-18,20-iminoallopregnene.

A stirred solution of 2.0 g. of the iminoallopregnene in 4 ml. of glacial acetic acid and 18 ml. of water is treated dropwise at 0° C. with a solution of 1.0 g. of sodium nitrite in 4 ml. of water. The mixture is allowed to stand for 18 hours at room temperature and the resulting solid filtered to yield 18-hydroxy-3,20-allopregnandione which is in equilibrium with the corresponding 18,20-hemiketal structure.

Similarly, as described above, 2.0 g. of 3-keto-19-norconanine is converted through the same sequence of reactions to 18-hydroxy-19-nor-3,20-allopregnandione.

*Example 7*

A solution of 20.0 g. of 3β-hydroxyconanine and 20.0 g. of cyanogen bromide in 1 l. of ether is allowed to stand at room temperature for four days. The reaction mixture is filtered and the filtrate extracted with dilute acetic acid. The ether layer is washed with sodium carbonate solution, dried and evaporated to give 3β-hydroxy-N-cyanonorconanine.

A solution of 8.0 g. of the N-cyanonorconanine and 9.0 g. of potassium hydroxide in 100 ml. of alcohol is refluxed for 48 hours. The reaction mixture is diluted with water and the solid 3β-hydroxy-N-norconanine removed, M.P. 169–172° C.

The 3β-hydroxy-N-norconanine prepared above is further treated as described in Example 4 to give 3β,18-dihydroxy-20-allopregnanone which is in equilibrium with the corresponding 18,20-hemiketal.

*Example 8*

To a solution of 2.0 g. of conanine in 200 ml. of ether is added an anhydrous solution of 2.1 g. of cyanogen bromide in 25 ml. of ether and the mixture maintained at 27° C. for 90 hours. The ether is removed by evaporation and the residue is dissolved in glacial acetic acid, diluted with water and extracted into chloroform. The chloroform extract is washed with water, 10% sodium hydroxide solution and water, dried and evaporated to give N-cyanonorconanine.

The N-cyanonorconanine (2.5 g.) and 7.0 g. of potassium hydroxide in 75 ml. of 95% alcohol is heated at reflux for 36 hours and then poured into water. The N-norconanine is extracted into chloroform and the extract treated directly with two 100 ml. portions of 5% sodium hypochlorite solution. The chloroform layer is washed, dried and evaporated to give N-chloronorconanine.

A solution of 2.0 g. of N-chloronorconanine and 4.0 g. of potassium hydroxide in 25 ml. of methanol is refluxed for one hour. The reaction mixture is poured into water, extracted with chloroform and the washed, dried extract is evaporated to give $\Delta^{20,N}$-18,20-iminoallopregnene.

A solution of 1.0 g. of $\Delta^{20,N}$-18,20-iminoallopregnene in 2 ml. of glacial acetic acid and 9 ml. of water is treated dropwise at 0° C. with a solution of 0.5 g. of sodium nitrite in 2 ml. of water. The mixture is allowed to stand at room temperature for 18 hours and the precipitate filtered to give 18-hydroxy-20-allopregnanone, in equilibrium with the 18,20-hemiketal form.

*Example 9*

A solution of 8.0 g. of 3β,21-diacetoxy-11-ketoconanine in 800 ml. of ether is treated with a solution of 7.0 g. of cyanogen bromide in 150 ml. of anhydrous ether and the reaction mixture maintained at 27° C. for 90 hours. The ether is treated with dilute acetic acid and then washed with dilute alkali and water. Evaporation of the ether yields 3β,21-diacetoxy-11-keto-N-cyanonnorconanine.

A solution of the N-cyanonorconanine (5.0 g.) and 12.5 g. of potassium hydroxide in 125 ml. of alcohol is boiled for 40 hours. The reaction mixture is poured into water and the 3β,21-dihydroxy-11-keto-N-norconanine is extracted into chloroform. The chloroform solution is stirred with two 150 ml. portions of 5% sodium hypochlorite solution to give upon subsequent removal of the chloroform 3β,21-dihydroxy-11-keto-N-chloronorconanine.

The N-chloronorconanine (3.0 g.) and 5.0 g. of potassium hydroxide dissolved in 30 ml. of methanol is refluxed for one hour, poured into water and extracted with chloroform. Evaporation of the washed, dried extract yields 3β,21-dihydroxy-11-keto-$\Delta^{20,N}$-18,20-iminoallopregnene.

A stirred solution of 2.5 g. of the iminoallopregnene in 5.0 ml. of glacial acetic acid and 20 ml. of water is treated dropwise at 0° C. with a solution of 1.2 g. of sodium nitrite in 5 ml. of water. The mixture is allowed to stand at room temperature for 24 hours and the precipitate filtered to give 3β,18,21-trihydroxy-11,20-allopregnandione which is in equilibrium with the corresponding tautomeric forms.

A sample of the above allopregnandione (1.0 g.) is treated with 2 ml. of acetic anhydride and 10 ml. of pyridine at room temperature for 12 hours. The solution is poured into water and filtered to yield 3β,21-diacetoxy-18-hydroxy-11,20-allopregnandione.

*Example 10*

Following the procedure of Example 2, 5.0 g. of 3α-hydroxy-16α-methyl-11-keto-5β-conanine is treated with 5.0 g. of cyanogen bromide in 100 ml. of ether to give 3α-hydroxy-16α-methyl-11-keto-5β-N-cyanonorconanine which is then hydrolyzed with 10.0 g. of potassium hydroxide in 100 ml. of alcohol at reflux for 40 hours. The reaction mixture is worked up and the corresponding N-norconanine in chloroform solution is treated with two 100 ml. portions of 5% sodium hypochlorite solution. Evaporation of the chloroform yields 3α-hydroxy-16α-methyl-11-keto-5β-N-chloronorconanine which is hydrolyzed with 5.0 g. of potassium hydroxide in 25 ml. of methanol solution at reflux for one hour. The reaction mixture is worked up to yield 3α-hydroxy-16α-methyl-11-keto-$\Delta^{20,N}$-18,20-iminopregnene.

The iminopregnene (2.0 g.) is dissolved in 4 ml. of glacial acetic acid and 18 ml. of water, stirred and treated with a solution of 1.0 g. of sodium nitrite in 4 ml. of water, dropwise at 0° C. The mixture is allowed to stand for 18 hours at 27° C. and then filtered to give the solid product 3α,18-dihydroxy-16α-methylpregnan-11,20-dione. The dihydroxydione is in equilibrium with its corresponding tautomeric forms.

*Example 11*

A solution of 6.0 g. of 3α,21-diacetoxy-5β-conanine in 600 ml. of ether is treated with an anhydrous solution of 6.0 g. of cyanogen bromide in 100 ml. of ether and the reaction mixture maintained at 27° C. for 90 hours. Following the procedure outlined in Example 2, the mixture is worked up to give 3α,21-diacetoxy-5β-N-cyanonorconanine. The N-cyanonorconanine thus prepared is then dissolved in 100 ml. of 95% alcohol and boiled with 10.0 g. of potassium hydroxide for 40 hours. The reaction mixture is poured into water and the resulting 3α,21-dihydroxy-5β-N-norconanine is isolated. The dihydroxy N-cyanonorconanine is converted to the 3α,21-diacetoxy-5β-N-norconanine by treatment in acetic acid solution with an exact stoichiometric equivalent amount of p-toluenesulfonic acid and 10.0 ml. of acetic anhydride, refluxing for one hour and pouring into water.

The 3α,21-dihydroxy-5β-N-norconanine (3.0 g.) is dissolved in 100 ml. of chloroform and treated with two 100 ml. portions of 5% sodium hypochlorite solution. Evaporation of the chloroform layer yields 3α,21-dihydroxy-5β-N-chloronorconanine. Similarly, treatment of 3α,21-diacetoxy-5β-N-norconanine (4.0 g.) with 5% sodium hypochlorite solution as above yields 3α,21-diacetoxy-5β-N-chloronorconanine.

A solution of 2.0 g. of 3α,21-dihydroxy-5β-N-chloronorconanine or 3.0 g. of 3α,21-diacetoxy-5β-N-chloronorconanine and 5.5 g. of potassium hydroxide in 30 ml. of methanol is refluxed for one hour, poured into water and extracted with chloroform. Evaporation of the extract yields 3α,21-dihydroxy-$\Delta^{20,N}$-18,20-iminopregnene.

The iminopregnene (1.0 g.) is treated with sodium nitrite in an aqueous acetic acid solution as described in Example 2 to give upon workup 3α,18,21-trihydroxypregnan-20-one.

*Example 12*

To a solution of 10.0 g. of 3β,16α-diacetoxyconanine in 1 l. of ether is added an anhydrous solution of 10.0 g. of cyanogen bromide in 200 ml. of ether and the reaction maintained at room temperature for four days. Following the procedure described in Example 2, the reaction mixture is worked up to give 3β,16α-diacetoxy-N-cyanonorconanine. The N-cyanonorconanine is dissolved in 200 ml. of alcohol and refluxed with 20.0 g. of potassium hydroxide for 48 hours. The reaction mixture is poured into water and the resulting 3β,16α-dihydroxy-N-norconanine is extracted into chloroform. The chloroform extract is treated with two 250 ml. portions of 5% sodium hypochlorite solution to give upon evaporation of the chloroform 3β,16α-dihydroxy-N-chloronorconanine. The latter compound (4.0 g.) is heated at reflux in 50 ml. of methanol with 10.0 g. of potassium hydroxide for one hour, poured into water and extracted with chloroform. Evaporation of the washed, dried extract yields 3β,16α-dihydroxy-$\Delta^{20,N}$-18,20-iminoallopregnene. The iminoallopregnene (1.5 g.) is dissolved in 3.0 ml. of glacial acetic acid and 10 ml. of water and treated dropwise at 0° C. with 1.0 g. of sodium nitrite dissolved in 5 ml. of water. The mixture is allowed to stand at room temperature for 18 hours, at which time the solid product 3β,16α,18-trihydroxy-20-allopregnanone which is in equilibrium with the 18,20-hemiketal form is isolated.

Treating the above allopregnanone (0.5 g.) with 2 ml. of acetic anhydride and 10 ml. of pyridine at room temperature for 12 hours yields 3β,16α-diacetoxy-18-hydroxy-20-allopregnanone.

*Example 13*

A solution of 5.0 g. of 3α,6β-diacetoxy-5β-conanine in 500 ml. of ether is added to an anhydrous solution of 5.1 g. of cyanogen bromide in 100 ml. of ether and the reaction mixture is maintained at 27° C. for 90 hours. Following the general procedure of Example 2, the mixture is worked up to give 3α,6β-diacetoxy-5β-N-cyanonorconanine. The N-cyanonorconanine is dissolved in 125 ml. of alcohol and 15.0 g. of potassium hydroxide is added. The mixture is heated at reflux for 48 hours, poured into water and the resulting 3α,6β-dihydroxy-5β-N-norconanine is extracted into chloroform. The chloroform extract is then treated with two 150 ml. portions of 5% sodium hypochlorite solution and the chloroform layer evaporated to give 3α,6β-dihydroxy-5β-N-chloronorconanine. The N-chloronorconanine is dissolved in 50 ml. of methanol and refluxed with 9.0 g. of potassium hydroxide for one hour. The reaction mixture is poured into water, extracted with chloroform and the washed, dried extract evaporated to yield 3α,6β-dihydroxy-$\Delta^{20,N}$-18,20-iminopregnene. The iminopregnene (2.0 g.) in 5 ml. of glacial acetic acid and 20 ml. of water is treated with a solution of 1.1 g. of sodium nitrite in 5 ml. of water at 0° C. The mixture is allowed to stand at room temperature for 24 hours and then filtered to give the solid 3α,6β,18-trihydroxypregnan-20-one which is in equilibrium with the 18,20-hemiketal tautomer.

Treating the above trihydroxypregnane (0.5 g.) with 3 ml. of acetic anhydride in 10 ml. of pyridine at room temperature for 12 hours yields 3α,6β-diacetoxy-18-hydroxypregnan-20-one.

*Example 14*

A solution of 4.0 g. of 3β-acetoxy-19-norconanine in 500 ml. of ether is treated with a solution of 5.0 g. of cyanogen bromide in 100 ml. of ether and the reaction maintained at 27° C. for four days. Following the general preparative outline of Example 2, the reaction mixture is worked up to give 3β-acetoxy-19-nor-N-cyanonorconanine. A solution of the N-cyanonorconanine and 7.0 g. of potassium hydroxide in 50 ml. of alcohol is refluxed for 40 hours and then poured into water. The resulting 3β-hydroxy-19-nor-N-norconanine is extracted into chloroform and the extract is treated with two 100 ml. portions of 5% sodium hypochlorite solution. Evaporation of the chloroform layer yields 3β-hydroxy-19-nor - N - chloronorconanine which is dissolved in 50 ml. of methanol and refluxed with 5.0 g. of potassium hydroxide for one hour. The reaction mixture is poured into water, extracted with chloroform and the extract evaporated to give 3β-hydroxy-19-nor-$\Delta^{20,N}$ - 18,20 - iminoallopregnene. The iminoallopregnene (2.0 g.) in 5 ml. of glacial acetic acid and 15 ml. of water is treated dropwise with a solution of 1.0 g. of sodium nitrite in 5 ml. of water at 0° C. After 18 hours at 27° C., the reaction mixture is filtered to give 3β,18-dihydroxy-19-nor-20-allopregnanone which is in equilibrium with the 18,20-hemiketal form.

Treating the above allopregnanone (0.5 g.) with 3 ml. of acetic anhydride in 10 ml. of pyridine at room temperature for 12 hours yields 3β-acetoxy-18-hydroxy-19-nor-20-allopregnanone.

*Example 15*

Following the general procedure of Example 2 for 3β-acetoxy-11-ketoconanine, 5.5 g. of 3β-hydroxy-11-keto-N-ethylconanine is reacted with 6.0 g. of cyanogen bromide to give 3β-hydroxy-11-keto-N-cyanonorconanine which is hydrolyzed with 10.0 g. of potassium hydroxide to 3β-hydroxy-11 - keto - N - norconanine. The N-norconanine thus prepared is similarly reacted as in Example 2 to yield 3β-18-dihydroxy-11,20-allopregnandione.

*Example 16*

Following the general procedure of Example 4 for 3β-acetoxyconanine, 20.0 g. of 3β-hydroxy-N-butylconanine is reacted with 15.0 g. of cyanogen bromide to give 3β-hydroxy-N-cyanonorconanine which is hydrolyzed with 80.0 g. of potassium hydroxide to 3β-hydroxy-N-norconanine. The N-norconanine thus prepared is similarly reacted as in Example 4 to give 3β,18-dihydroxy-20-allopregnanone.

*Example 17*

Following the general procedure of Example 3 for 3α-acetoxy-11-keto-5β-conanine, 6.0 g. of 3α - hydroxy - 11-keto-5β-N-isopropylconanine is reacted with 5.0 g. of cyanogen bromide to give 3α-hydroxy - 11 - keto-5β - N-cyanonorconanine which is hydrolyzed with 15.0 g. of potassium hydroxide to 3α - hydroxy - 11 - keto - 5β - N-norconanine. The N-norconanine thus prepared is similarly reacted as in Example 3 to give 3α-18-dihydroxy-pregnan-11,20-dione.

*Example 18*

A solution of 3α,11β-dihydroxy-5β-conanine in 500 ml. of ether is treated with a solution of 6.0 g. of cyanogen bromide in 100 ml. of ether and the mixture is maintained at 27° C. for four days. Following the general procedure of Example 2, the reaction mixture is worked up to give 3α,11β-dihydroxy-5β - N - cyanonorconanine. The N-cyanonorconanine is dissolved in 75 ml. of alcohol and refluxed with 10.0 g. of potasisum hydroxide for 48 hours. The reaction mixture is poured into water and the product 3α-11β-dihydroxy-5β-N-norconanine is extracted into chloroform. The chloroform extract is then stirred with two 100 ml. portions of 5% sodium hypochlorite solution, each time for thirty minutes. Evaporation of the chloroform layer yields 3α,11β-dihydroxy-5β-N-chloronorconanine which is boiled with 5.0 g. of potassium hydroxide in 25 ml. of methanol for one hour. The reaction mixture is poured into water, extracted with chloroform and the extract evaporated to give 3α,11β-dihydroxy-$\Delta^{20,N}$-18,20 - iminopregnene. The iminopregnene (2.5 g.) is dissolved in 5 ml. of glacial acetic acid and 20 ml. of water and then treated dropwise with stirring at 0° C. with a solution of 1.5 g. of sodium nitrite in 5 ml. of water. The reaction mixture is allowed to stand at 27° C. for 24 hours and then filtered to yield 3α,11β,18-trihydroxypregnan-20-one which is in equilibrium with its 18,20-hemiketal form.

Similarly, by reacting the isomeric 3β,11α-dihydroxyconanine (6.0 g.) or 3α,11α-dihydroxy-5β-conanine (6.0 g.) as described above and in Example 2, the corresponding 3β,11α,18-trihydroxypregnan-20-allopregnanone and 3α,11α,18-trihydroxypregnan-20-one are obtained.

Treating the above 3α,11β,18-trihydroxypregnan-20-one (0.5 g.) with 5 ml. of acetic anhydride and 0.1 g. of p-toluenesulfonic acid in glacial acetic acid solution at reflux for eight hours yields 3α,11β-diacetoxy-18-hydroxypregnan-20-one.

*Example 19*

A solution of 10.0 g. of 3β,5α,6β-trihydroxyconanine in 1 l. of ether is treated with anhydrous solution of 11.0 g. of cyanogen bromide in 200 ml. of ether and the mixture is maintained at 27° C. for four days. Following the general procedure of Example 2, the reaction mixture is worked up to yield 3β,5α,6β-trihydroxy-N-cyanonorconanine. The N-cyanonorconanine is dissolved in 150 ml. of alcohol and refluxed with 20.0 g. of potassium hydroxide for 40 hours. The reaction mixture is poured into water and the 3β,5α,6β-trihydroxy-N-norconanine is extracted into chloroform. The chloroform extract is stirred with two 150 ml. portions of 5% sodium hypochlorite solution to give upon evaporation of the chloroform layer 3β,5α,6β-trihydroxy-N-chloronorconanine. A solution of the N-chloronorconanine and 10.0 g. of potassium hydroxide in 75 ml. of methanol is heated at reflux for one hour, poured into water and extract with chloroform. Evaporation of the washed, dried chloroform extract yields 3β,5α,6β-trihydroxy-$\Delta^{20,N}$-18,20-iminoallopregnene. The iminoallopregnene (2.0 g.) is dissolved in 5 ml. of glacial acetic acid and 20 ml. of water and treated at 0° C. with a solution of 1.5 g. of sodium nitrite in 5 ml. of water. The reaction mixture is allowed to stand at room temperature for 18 hours and then filtered to give 3β,5α,6β,18-tetrahydroxy-20-allopregnanone which is in equilibrium with the corresponding 18,20-hemiketal.

*Example 20*

A solution of 5.0 g. of 5α-acetoxy-3β-hydroxy-6β-methyl-11-ketoconanine in 500 ml. of ether is treated with an anhydrous solution of 4.5 g. of cyanogen bromide in 75 ml. of ether and the mixture maintained at 27° C. for four days. Following the general procedure of Example 2, the reaction mixture is worked up to yield 5α - acetoxy - 3β - hydroxy - 6β - methyl - 11 - keto - N - cyanonorconanine. The N-cyanonorconanine is dissolved in 50 ml. of 95% alcohol containing 10.0 g. of potassium hydroxide and the solution is heated at reflux for 40 hours. The reaction mixture is poured into water and the 3β,5α - dihydroxy-6β-methyl-11-keto-N-norconanine is extracted into chloroform. The chloroform extract is then stirred with two 100 ml. portions of 5% sodium hypochlorite solution, each time for 30 minutes. The residue from evaporation of the washed, dried chloroform layer consisting of 3β,5α-dihydroxy-6β-methyl-11-keto-N-chloronorconanine is boiled in 35 ml. of methanol with 5.0 g. of potassium hydroxide for one hour. The reaction mixture is poured into water, extracted with chloroform, and the washed, dried extract evaporated to yield 3β,5α-dihydroxy-6β-methyl-11-keto-$\Delta^{20,N}$ - 18,20 - iminoallopregnene. The iminopregnene (1.0 g.) dissolved in 3 ml. of glacial acetic acid and 10 ml. of water is treated dropwise at 0° C. for 24 hours and then filtered to give 3β,5α,18-trihydroxy-6β-methyl-11,20-allopregnandione. The dione is in equilibrium with its tautomeric forms.

Treating the above allopregnandione (0.5 g.) with 5 ml. of acetic anhydride and 0.1 g. of p-toluenesulfonic acid in glacial acetic acid solution at reflux for eight hours yields 3β,5α-diacetoxy-18-hydroxy-6β-methyl-11,20-allopregnandione.

*Example 21*

A solution of 10.0 g. of 3β,5α-dihydroxy-6β-methyl-19-norconanine and 9.0 g. of cyanogen bromide in 1200 ml. of ether is maintained at room temperature (27° C.) for four days. Following the general procedure of Example 2, the reaction mixture is worked up to give 3β,5α - dihydroxy - 6β - methyl - 19 - nor - N - cyanonorconanine. A solution of the N-cyanonorconanine in 150 ml. of 95% alcohol containing 15.0 g. of potassium hydroxide is refluxed for 40 hours and then poured into water. The 3β,5α - dihydroxy-6β-methyl-19-nor-N-norconanine is extracted into chloroform and the extract stirred with two 150 ml. portions of 5% sodium hypochlorite solution. Evaporation of the chloroform layer yields 3β,5α - dihydroxy-6β-methyl-19-nor-N-chloronorconanine which is dissolved in 75 ml. of methanol and refluxed for one hour with 10.0 g. of potassium hydroxide. The reaction mixture is poured into water, extracted with chloroform and the extract evaporated to give 3β,5α - dihydroxy - 6β - methyl - 19-nor-$\Delta^{20,N}$-18,20-iminoallopregnene. The iminoallopregnene (2.5 g.) is dissolved in 5 ml. of glacial acetic acid and 20 ml. of water and then treated with a solution of 1.5 g. of sodium nitrite in 5 ml. of water at 0° C. The reaction mixture is allowed to stand for 18 hours at 27° C. and then filtered to give 3β,5α-18-trihydroxy-6β-methyl-19-nor-20-allopregnanone which is in equilibrium with the 18,20-hemiketal form.

Similarly, following the above preparative procedure and the outline of Example 2, 12.0 g. of 3β,5α-diacetoxy-6β-methylconanine is converted through the analogous intermediates to 3β,5α,19 - trihydroxy-6β-methyl-20-allopregnanone.

*Example 22*

A solution of 6.0 g. of 6β-methyl-3β,5α,11α-trihydroxyconanine in 600 ml. of ether is treated with an anhydrous solution of 5.0 g. of cyanogen bromide in 100 ml. of ether and the mixture is maintained at 27° C. for 90 hours. Following the general procedure of Example 2, the reaction mixture is worked up to give 6β-methyl-3β,5α,11α-trihydroxy-N-cyanonorconanine. The N-cyanonorconanine is dissolved in 75 ml. of 95% alcohol and refluxed with 10.0 g. of potassium hydroxide for 40 hours. The reaction mixture is poured into water and the 6β-methyl-3β,5α,11α-trihydroxy-N-norconanine is extracted into chloroform. The chloroform extract is stirred with two 100 ml. portions of 5% sodium hypochlorite solution, separated and evaporated to give 6β - methyl - 3β,5α,11α-trihydroxy-N-chloronorconanine. The N-chloronorconanine is dissolved in 30 ml. of methanol and refluxed for one hour with 5.0 g. of potassium hydroxide. The reaction mixture is poured into water, extracted with chloroform and the extract evaporated to give 6β-methyl-3β,5α,11α-trihydroxy-$\Delta^{20,N}$-18,20-iminoallopregnene. The iminoallopregnene (2.0 g.) dissolved in 5 ml. of glacial acetic acid and 20 ml. of water is treated dropwise at 0° C. with a solution of 1.0 g. of sodium nitrite in 5 ml. of water. The reaction mixture is allowed to stand at room temperature for 24 hours and then filtered to yield 6β-methyl-3β,5α,11α,18-tetrahydroxy - 20-allopregnanone which is in equilibrium with its 18,20-hemiketal form.

*Example 23*

A solution of 5.0 g. of 3,11-diketoconanine and 5.0 g. of cyanogen bromide in 1 l. of ether is maintained at 27° C. for four days. The ether is evaporated, the residue is dissolved in aqueous acetic acid and then extracted with chloroform. The chloroform extract is washed with water, 10% sodium hydroxide solution and water, dried and evaporated to give 3,11-diketo-N-cyanonorconanine. Following the general reaction procedure outlined in Example 2, the N-cyanonorconanine is dissolved in 75 ml. of 95% alcohol containing 10.0 g. of potassium hydroxide and refluxed for 40 hours. The reaction mixture is poured into water and the 3,11-diketo-N-norconanine is extracted into chloroform. The chloroform extract is stirred with two 100 ml. portions of 5% sodium hypochlorite solution, each time for 30 minutes. The separated chloroform layer is evaporated to give 3,11-diketo-N-chloronorconanine which is dissolved in 25 ml. of methanol and refluxed with 5.0 g. of potassium hydroxide for one hour. The reaction mixture is poured into water, extracted with chloroform and the extract evaporated to give 3,11-diketo-$\Delta^{20,N}$-18,20-iminoallopregnene. The iminoallopregnene (1.0 g.) is dissolved in 2 ml. of glacial acetic acid and 9 ml. of water and then treated dropwise at 0° C. with a solution of 0.5 g. of sodium nitrite in 2 ml. of water. The mixture is allowed to stand for 18 hours at 27° C. and then filtered to yield the solid product 18-hydroxy-3,11,20-allopregnantrione which is in equilibrium with its corresponding tautomeric forms.

Similarly, following the above procedure and the outline of Example 2, 6.0 g. of 3,11-diketo-16α-methyl-5β-conanine is converted through the corresponding intermediates to the product 18-hydroxy-16α-methylpregnan-3,11,20-trione.

*Example 24*

To a solution of 8.0 g. of 5α-acetoxy-6β-methyl-3-keto-19-norconanine in 1 l. of ether is added an anhydrous solution of 7.0 g. of cyanogen bromide in 100 ml. of ether and the mixture maintained at 27° C. for four days. Following the general procedure of Example 2, the reaction mixture is worked up to yield 5α-acetoxy-6β-methyl-3 - keto - 19-nor-N-cyanonorconanine. The N-cyanonorconanine is dissolved in 100 ml. of 95% alcohol containing 15.0 g. of potassium hydroxide and refluxed for 40 hours. The reaction mixture is poured into water and the 5α-hydroxy-6β-methyl-3-keto-19-nor-N-norconanine is extracted into chloroform. The chloroform extract is stirred with two 150 ml. portions of 5% sodium hypochlorite solution to yield after evaporation of the dried chloroform layer 5α-hydroxy-6β-methyl-3-keto-19-nor-N-chloronorconanine. The N-chloronorconanine is dissolved in 50 ml. of methanol and refluxed for one hour with 7.0 g. of potassium hydroxide. The reaction mixture is poured into water, extracted with chloroform and the extract evaporated to yield 5α-hydroxy-6β-methyl-3-keto-19-nor-$\Delta^{20,N}$-18,20-iminoallopregnene. The iminoallopregnene (3.0 g.) is dissolved in 6 ml. of glacial acetic acid and 25 ml. of water and treated dropwise at 0° C. with a solution of 2.0 g. of sodium nitrite in 6 ml. of water. The reaction mixture is allowed to stand for 18 hours at 27° C. and then filtered to give 5α,18-dihydroxy-6β-methyl-19-nor-3,20-allopregnandione which is in equilibrium with the corresponding 18,20-hemiketal form.

Treating 0.5 g. of the above allopregnanone with 3 ml. of acetic anhydride and 0.1 g. of p-toluenesulfonic acid in glacial acetic acid at reflux for eight hours yields the corresponding 5α-acetoxy-18-hydroxy-6β-methyl-19-nor-3,20-allopregnandione.

*Example 25*

A solution of 6.0 g. of 3β-hydroxy-9α-fluoro-11-ketoconanine in 700 ml. of ether is treated with a solution of 6.0 g. of cyanogen bromide in 100 ml. of ether and the mixture is maintained at 27° C. for 90 hours. Following the general outline of Example 2, the reaction mixture is worked up to give 3β-hydroxy-9α-fluoro-11-keto-N-cyanonorconanine. The N-cyanonorconanine and 10.0 g. of potassium hydroxide are dissolved in 100 ml. of 95% alcohol, the solution is boiled for 40 hours and then poured into water. The resulting 3β-hydroxy-9α- fluoro-11-keto-N-norconanine is extracted into chloroform and the chloroform solution stirred with two 100 ml. portions of 5% sodium hypochlorite solution. The separated chloroform layer is washed, dried and evaporated to give 3β-hydroxy-9α-fluoro-11-keto-N-chloronorconanine. The N-chloronorconanine is dissolved in 25 ml. of methanol, 5.0 g. of potassium hydroxide is added and the solution refluxed for one hour, poured into water and extracted with chloroform. Evaporation of the chloroform extract yields 3β-hydroxy-9α-fluoro-11-keto-$\Delta^{20,N}$-18,20-iminoallopregnene. The iminoallopregnene (1.0 g.) is dissolved in 2 ml. of glacial acetic acid and 10 ml. of water and treated dropwise at 0° C. with a solution of 0.5 g. of sodium nitrite in 2 ml. of water. The mixture is allowed to stand at room temperature for 18 hours and then filtered to yield 3β,18-dihydroxy-9α-fluoro-11,20-allopregnandione which is in equilibrium with the corresponding tautomeric forms.

Treating 0.5 g. of the above allopregnandione with 3 ml. of acetic anhydride in 10 ml. of pyridine at room temperature for 12-18 hours yields the corresponding 3β-acetoxy-18-hydroxy-9α-fluoro-11,20-allopregnandione.

Similarly, by employing 5.0 g. of 6α,9α-difluoro-3β-hydroxy-11-ketoconanine or 6.0 g. of 6α-fluoro-3β-hydroxy-11-ketoconanine in the reaction sequence described above and in Example 2, there is obtained the corresponding 6α,9α-difluoro-3β,18-hydroxy-11,20-allopregnandione and 3β,18-dihydroxy-6α-fluoro-11,20-allopregnandione.

*Example 26*

A solution of 5.0 g. of 6α-fluoro-3α-hydroxy-5β-conanine in 600 ml. of ether is treated with an anhydrous solution of 5.0 g. of cyanogen bromide in 100 ml. of ether and the reaction is maintained at 27° C. for four days. Following the general procedure of Example 2, the reaction mixture is worked up to give 6α-fluoro-3α-hydroxy-5β-N-cyanonorconanine which is dissolved in 75 ml. of 95% alcohol containing 10.0 g. of potassium hydroxide. The solution is refluxed for 40 hours, poured into water and the resulting 6α-fluoro-3α-hydroxy-5β-N-norconanine is extracted into chloroform. The chloroform solution is then stirred with two 100 ml. portions of 5% sodium hypochlorite solution. The chloroform layer is washed, dried and evaporated to yield 6α-fluoro-3α-hydroxy-5β-N-chloronorconanine. The N-chloronorconanine is then dissolved in 30 ml. of methanol, 5.0 g. of potassium hydroxide is added and the solution refluxed for one hour. The reaction mixture is poured into water, extracted with chloroform and the chloroform evaporated to give 6α-fluoro-3α-hydroxy-$\Delta^{20,N}$-18,20-iminopregnene. The iminopregnene (2.0 g.) is dissolved in 5 ml. of glacial acetic acid and 20 ml. of water and treated dropwise at 0° C. with a solution of 1.1 g. of sodium nitrite in 5 ml. of water. The mixture is allowed to stand for 18 hours at 27° C. and then filtered to give 3α,18-dihydroxy 6α-fluoropregnan-20-one which is in equilibrium with its 18,20-hemiketal form.

Similarly, by reacting 5.5 g. of 3β,5α-dihydroxy-6β-fluoroconanine or 5.0 g. of 3β,5α-dihydroxy-6β-fluoro-19-norconanine in the sequence described above and in Example 2, there is obtained the corresponding 3β,5α,18-trihydroxy-6β-fluoro-20-allopregnanone and 3β,5α,18-trihydroxy-6β-fluoro-19-nor-20-allopregnanone.

*Example 27*

A solution of 6.0 g. of 3β,11β-dihydroxy-19-norconanine in 600 ml. of ether is treated with a solution of 6.0 g. of cyanogen bromide in 100 ml. of ether and the mixture maintained at 27° C. for four days. Following the general procedure outlined in Example 2, the reaction mixture is worked up to give 3β,11β-dihydroxy-19-nor-N-cyanonorconanine. The N-cyanonorconanine is dissolved in 100 ml. of 95% alcohol containing 10.0 g. of potassium hydroxide and refluxed for 40 hours. The reaction mixture is poured into water, extracted with chloroform and the chloroform extract containing 3β,11β-dihydroxy-19-nor-N-norconanine is stirred with two 100 ml. portions of 5% sodium hypochlorite solution. The chloroform layer is washed, dried and evaporated to give 3β,11β-dihydroxy-19-nor-N-chloronorconanine which is dissolved in 50 ml. of methanol. Potassium hydroxide (5.0 g.) is added to the solution and then refluxed for one hour. The reaction mixture is poured into water, extracted with chloroform and the extract evaporated to yield 3β,11β-dihydroxy - 19 - nor - $\Delta^{20,N}$-18,20-iminoallopregnene. The iminoallopregnene (1.0 g.) dissolved in 2 ml. of glacial acetic acid and 10 ml. of water is treated dropwise at 0° C. with a solution of 0.5 g. of sodium nitrite in 2 ml. of water. The mixture is allowed to stand for 18 hours at 27° C. and then filtered to give the solid product 3β,11β,18-trihydroxy-19-nor-20-allopregnanone which is in equilibrium with its corresponding 18,20-hemiketal form.

Treating the above allopregnanone (0.5 g.) with 5 ml. of acetic anhydride and 0.1 g. of p-toluenesulfonic acid in glacial acetic acid solution at reflux for eight hours yields 3β,11β-diacetoxy-18-hydroxy-19-nor-20-allopregnanone.

*Example 28*

A stirred solution of 6.6 g. of 18-hydroxy-3,11,20-allopregnantrione in 100 ml. of acetic acid is treated with 34 ml. of 1.79 M hydrogen bromide in acetic acid and then with 4.95 g. of bromine in 25 ml. of acetic acid. After 10 minutes the solution is poured into one liter of water and the solid 2,4-dibromo-18-hydroxy-3,11,20-allopregnantrione separated by filtration. The dibromide is added to a suspension prepared by dissolving 4.4 g. of bromine in 42 ml. of acetone, adding 3.4 g. of sodium carbonate, stirring and filtering, then adding 4.0 g. of sodium iodide followed by a brief reflux period. The resulting mixture is stirred for 2.5 hours, then 7.4 g. of oxalic acid dihydrate is added followed by refluxing for one hour. Ethyl acetate (400 ml.) and water (one liter) are added and the organic layer is washed with water, 5% sodium bicarbonate and water. It is then stirred with 70.0 g. of zinc dust and 2 ml. of acetic acid, filtered and washed again. The filtrate is evaporated to give a solid which is taken up in 80 ml. of ethanol and acidified with 6 ml. of acetic acid. After addition of 3.0 g. of Girard's Reagent "T," the solution is boiled for 30 minutes, cooled to 20° C., treated with formaldehyde, allowed to stand for 25 minutes and then extracted with ethyl acetate. The water layer is acidified to pH 1, allowed to stand for two hours and then extracted with ethyl acetate. This ethyl acetate extract is washed, dried and evaporated to give 18-hydroxy-3,11,20-triketo-4-pregnene which is in equilibrium with its tautomeric forms.

*Example 29*

A solution of 2.6 g. of 18-hydroxy-16α-methylpregnan-3,11,20-trione and 60 mg. of p-toluene sulfonic acid monohydrate in 30 ml. of dimethylformamide is treated with 1.1 g. of bromine dissolved in 10 ml. of dimethylformamide. The solution is stirred at room temperature as the bromide is added dropwise, the bromine color being discharged between drops. When the addition is complete, the reaction mixture is diluted with water, extracted with ether and the ether extract washed, dried and evaporated to give 4-bromo-18-hydroxy-16α-methylpregnan-3,11,20-trione. The trione and 1.2 g. of lithium chloride dissolved in 20 ml. of dimethylformamide are heated under nitrogen on the steam bath for two hours. The reaction mixture is treated with water, extracted with methylene chloride and the washed, dried extract is evaporated to yield 18-hydroxy-16α-methyl - 3,11,20-triketo-4-pregnene which is in equilibrium with its corresponding tautomeric forms.

This application is a continuation-in-part of application Serial No. 843,334, filed September 30, 1959, which is a continuation-in-part of application Serial No. 821,348, filed June 19, 1959.

What is claimed is:

1. The method of forming $\Delta^{20,N}$-18,20-iminopregnenes having the following formula:

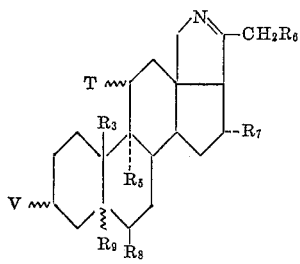

in which $\xi$ is a configurational position selected from the group consisting of $\alpha$ and $\beta$; V and T are members selected from the group consisting of hydrogen, hydroxy and keto; $R_3$ is a member selected from the group consisting of hydrogen and methyl; $R_5$ is a member selected from the group consisting of hydrogen and fluoro; $R_6$ and $R_9$ are members selected from the group consisting of hydrogen and hydroxy; $R_7$ is a member selected from the group consisting of hydrogen, hydroxy and methyl; and $R_8$ is a member selected from the group consisting of hydrogen, hydroxy, methyl and fluoro, which comprises reacting with cyanogen bromide a conanine derivative having the following formula:

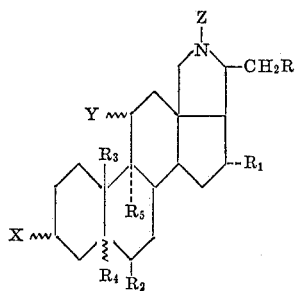

in which $\xi$ is a configurational position selected from the group consisting of $\alpha$ and $\beta$; X and Y are members selected from the group consisting of hydrogen, hydroxy, acyloxy and keto; R and $R_4$ are members selected from the group consisting of hydrogen, hydroxy and acyloxy; $R_1$ is a member selected from the group consisting of hydrogen, hydroxy, acyloxy and methyl; $R_2$ is a member selected from the group consisting of hydrogen, hydroxy, acyloxy, methyl and fluoro; $R_3$ is a member selected from the group consisting of hydrogen and methyl; $R_5$ is a member selected from the group consisting of hydrogen and fluoro; and Z is lower alkyl, each of said acyloxy moieties being an organic hydrocarbon carboxylic acid radical having a maximum of six carbon atoms, to form a N-cyanonorconanine having the following formula:

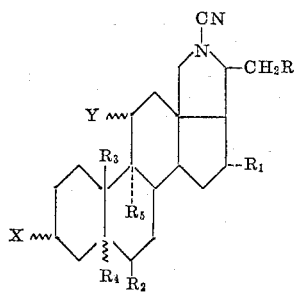

in which $\xi$, X, Y, R, $R_1$, $R_2$, $R_3$, $R_4$ and $R_5$ are as defined above; hydrolyzing said N-cyanonorconanine to form a N-norconanine having the following formula:

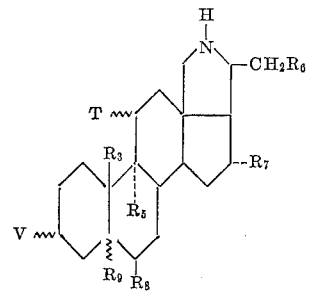

in which $\xi$, V, T, $R_3$, $R_5$, $R_6$, $R_7$, $R_8$ and $R_9$ are as defined above; reacting said N-norconanine with a halogenating agent selected from the group consisting of N-chlorosuccinimide, N-bromosuccinimide, N-bromoacetamide, hypochlorous acid and sodium hypochlorite to form a N-halonorconanine having the following formula:

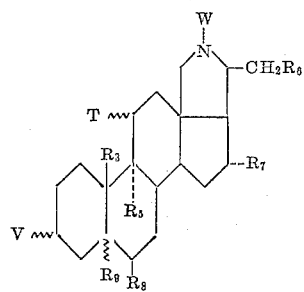

in which W is halogen of atomic weight less than 80; and $\xi$, V, T, $R_3$, $R_5$, $R_6$, $R_7$, $R_8$ and $R_9$ are as defined above; and dehydrohalogenating said N-halonorconanine with a member selected from the group consisting of an alkali metal hydroxide and an alkali metal lower alkoxide.

2. The method in accordance with claim 1 in which the N-cyanonorconanine is hydrolized with an alkali metal hydroxide.

3. A compound having the formula:

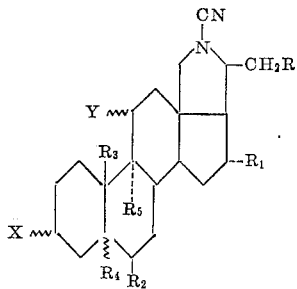

in which $\xi$ is a configurational position selected from the group consisting of $\alpha$ and $\beta$; X and Y are members selected from the group consisting of hydrogen, hydroxy, acyloxy and keto; R and $R_4$ are members selected from the group consisting of hydrogen, hydroxy and acyloxy; $R_1$ is a member selected from the group consisting of hydrogen, hydroxy, acyloxy and methyl; $R_2$ is a member selected from the group consisting of hydrogen, hydroxy, acyloxy, methyl and fluoro; $R_3$ is a member selected from the group consisting of hydrogen and methyl; and $R_5$ is a member selected from the group consisting of hydrogen and fluoro, each of said acyloxy moieties being an organic hyrocarbon carboxylic acid radical having a maximum of six carbon atoms.

4. A compound having the formula:

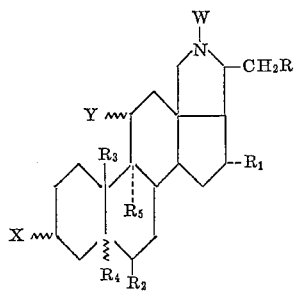

in which ξ is a configurational position selected from the group consisting of α and β; W is halogen of atomic weight less than 80; X and Y are members selected from the group consisting of hydrogen, hydroxy, acyloxy and keto; R and $R_4$ are members selected from the group consisting of hydrogen, hydroxy and acyloxy; $R_1$ is a member selected from the group consisting of hydrogen, hydroxy, acyloxy and methyl; $R_2$ is a member selected from the group consisting of hydrogen, hydroxy, acyloxy, methyl and fluoro; $R_3$ is a member selected from the group consisting of hydrogen and methyl; and $R_5$ is a member selected from the group consisting of hydrogen and fluoro, each of said acyloxy moieties being an organic hydrocarbon carboxylic acid radical having a maximum of six carbon atoms.

5. A compound having the formula:

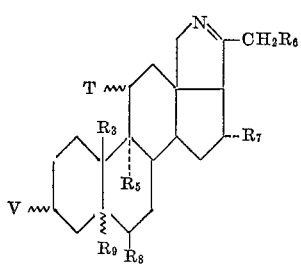

in which ξ is a configurational position selected from the group consisting of α and β; V and T are members selected from the group consisting of hydrogen, hydroxy and keto; $R_6$ and $R_9$ are members selected from the group consisting of hydrogen and hydroxy; $R_7$ is a member selected from the group consisting of hydrogen, hydroxy and methyl; $R_8$ is a member selected from the group consisting of hydrogen, hydroxy, methyl and fluoro; $R_3$ is a member selected from the group consisting of hydrogen and methyl; and $R_5$ is a member selected from the group consisting of hydrogen and fluoro.

6. A compound selected from the group consisting of compounds having the formulae:

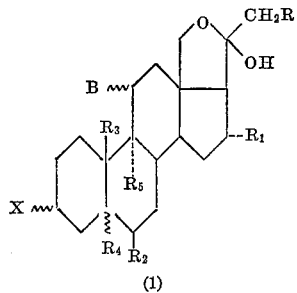

(1)

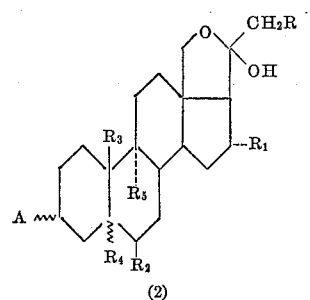

(2)

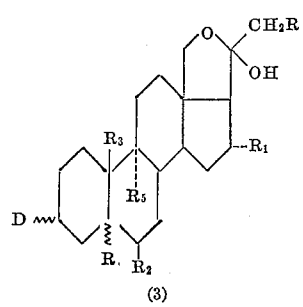

(3)

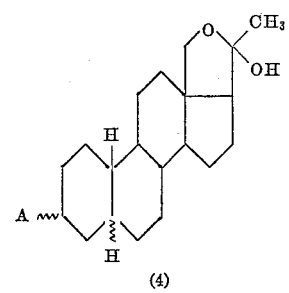

(4)

in which ξ is a configurational position selected from the group consisting of α and β; X is a member selected from the group consisting of hydrogen, hydroxy, acyloxy and keto; B is a member selected from the group consisting of hydroxy, acyloxy and keto; R and $R_4$ are members selected from the group consisting of hydrogen, hydroxy and acyloxy; $R_1$ is a member selected from the group consisting of hydrogen, hydroxy, acyloxy and methyl; $R_2$ is a member selected from the group consisting of hydrogen, hydroxy, acyloxy, methyl and fluoro; $R_3$ is a member selected from the group consisting of hydrogen and methyl; $R_5$ is a member selected from the group consisting of hydrogen and fluoro; A is a member selected from the group consisting of hydroxy and acyloxy; D is a member selected from the group consisting of hydrogen and keto, each of said acyloxy moieties being an organic hydrocarbon carboxylic acid radical having a maximum of six carbon atoms; and with at least one of the substituents R, $R_1$, $R_2$, $R_4$ and $R_5$ in Formula 2 being other than hydrogen.

7. A compound having the formula:

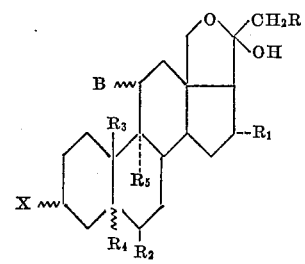

in which ξ is a configurational position selected from the group consisting of α and β; X is a member selected from the group consisting of hydrogen, hydroxy, acyloxy and keto; B is a member selected from the group consisting of hydroxy, acyloxy and keto; R and $R_4$ are members selected from the group consisting of hydrogen, hydroxy and acyloxy; $R_1$ is a member selected from the group consisting of hydrogen, hydroxy, acyloxy and methyl; $R_2$ is a member selected from the group consisting of hydrogen, hydroxy, acyloxy, methyl and fluoro; $R_3$ is a member selected from the group consisting of hydrogen and methyl; and $R_5$ is a member selected from the group consisting of hydrogen and fluoro, each of said acyloxy moieties being an organic hydrocarbon carboxylic acid radical having a maximum of six carbon atoms.

8. A compound having the formula:

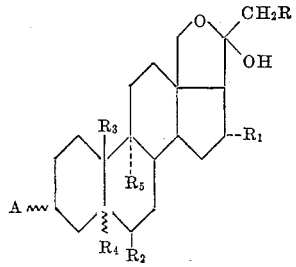

in which $\xi$ is a configurational position selected from the group consisting of $\alpha$ and $\beta$; A is a member selected from the group consisting of hydroxy and acyloxy; R and $R_4$ are members selected from the group consisting of hydrogen, hydroxy and acyloxy; $R_1$ is a member selected from the group consisting of hydrogen, hydroxy, acyloxy and methyl; $R_2$ is a member selected from the group consisting of hydrogen, hydroxy, acyloxy, methyl and fluoro; $R_3$ is a member selected from the group consisting of hydrogen and methyl; $R_5$ is a member selected from the group consisting of hydrogen and fluoro, each of said acyloxy moieties being an organic hydrocarbon carboxylic acid radical having a maximum of six carbon atoms; and with at least one of the substituents R, $R_1$, $R_2$, $R_4$ and $R_5$ being other than hydrogen.

9. A compound having the formula:

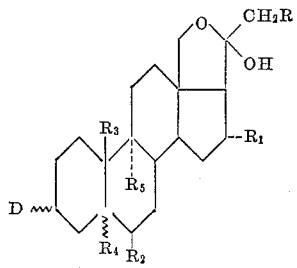

in which $\xi$ is a configurational position selected from the group consisting of $\alpha$ and $\beta$; D is a member selected from the group consisting of hydrogen and keto; R and $R_4$ are members selected from the group consisting of hydrogen, hydroxy and acyloxy; $R_1$ is a member selected from the group consisting of hydrogen, hydroxy, acyloxy and methyl; $R_2$ is a member selected from the group consisting of hydrogen, hydroxy, acyloxy, methyl and fluoro; $R_3$ is a member selected from the group consisting of hydrogen and methyl; and $R_5$ is a member selected from the group consisting of hydrogen and fluoro, each of said acyloxy moieties being an organic hydrocarbon carboxylic acid radical having a maximum of six carbon atoms.

10. A compound having the formula:

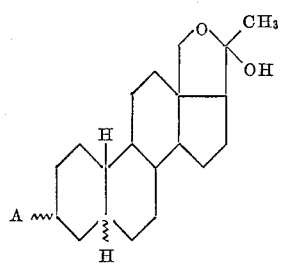

in which $\xi$ is a configurational position selected from the group consisting of $\alpha$ and $\beta$; A is a member selected from the group consisting of hydroxy and acyloxy, said acyloxy moiety being an organic hydrocarbon carboxylic acid radical having a maximum of six carbon atoms.

11. The method in accordance with claim 1 in which the halogenating agent is sodium hypochlorite.

12. A compound having the formula:

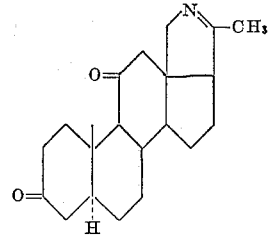

13. A compound having the formula:

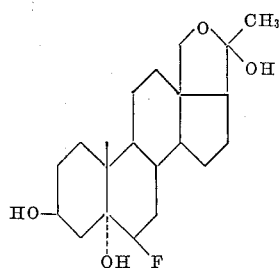

14. A compound having the formula:

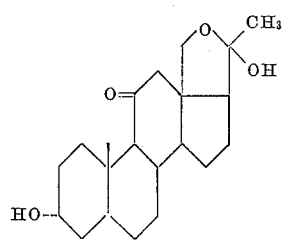

15. A compound having the formula:

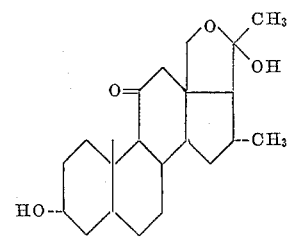

16. A compound having the formula:

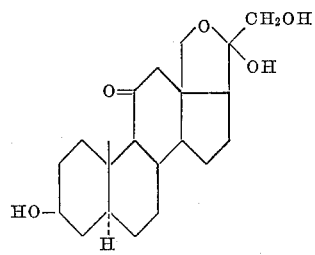

17. A compound having the formula:
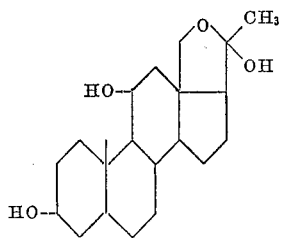
18. A compound having the formula:
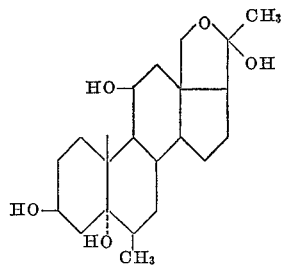
19. A compound having the formula:
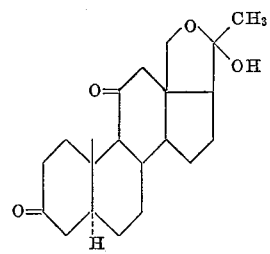
20. A compound having the formula:
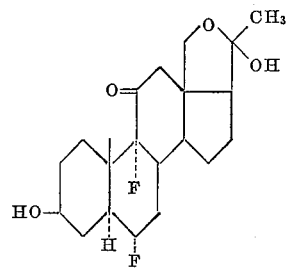
21. A compound having the formula:
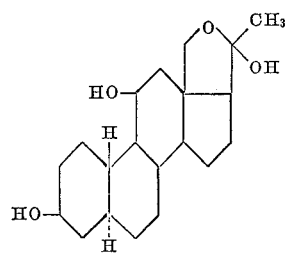
References Cited in the file of this patent
UNITED STATES PATENTS
2,912,432    Pappo et al. _____ Nov. 10, 1959
OTHER REFERENCES
Buzzetti et al.: Halv. Chim. Acta, vol. 42, pp. 388–390 (Feb. 2, 1959).
Buchschacher et al.: J.A.C.S., vol. 80, pp. 2905–6 (1958).